UNITED STATES PATENT OFFICE.

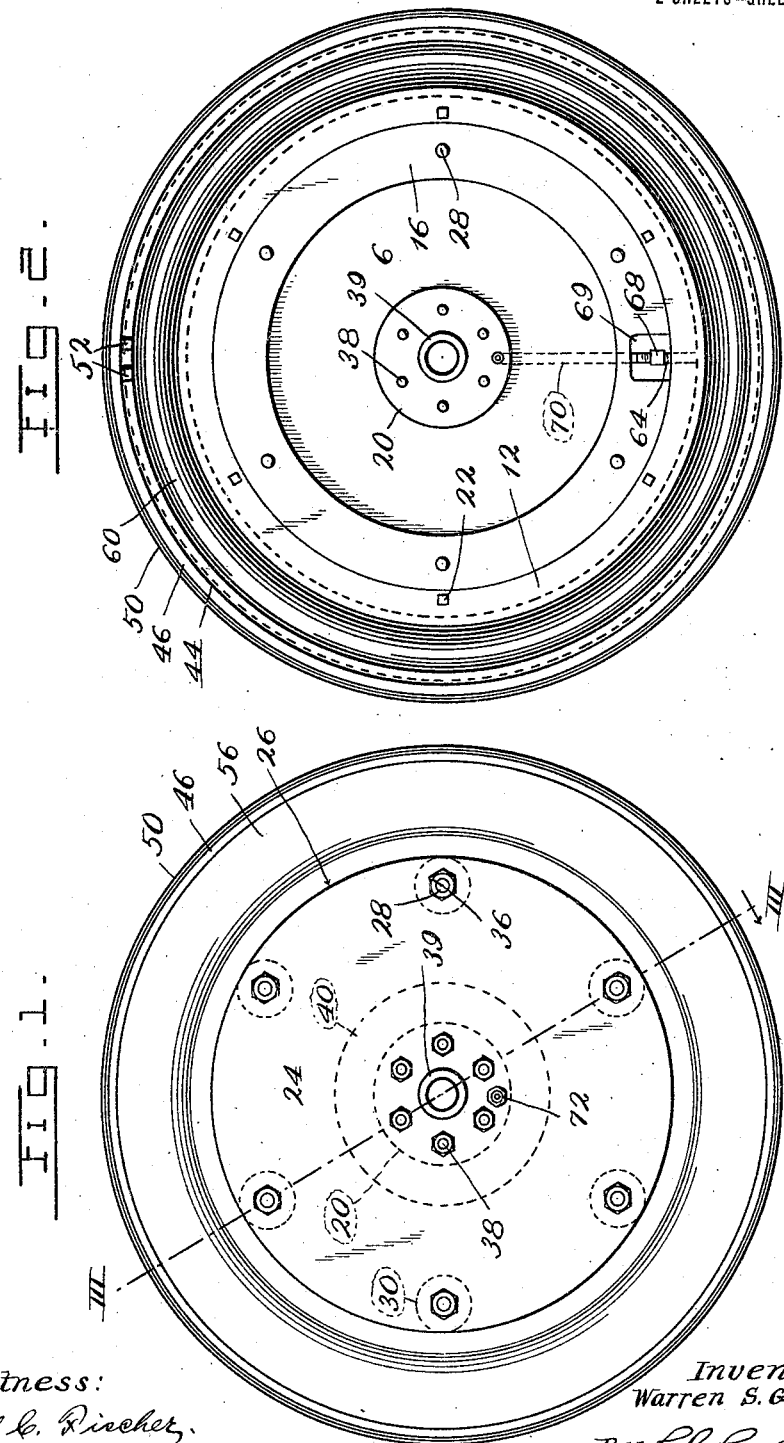

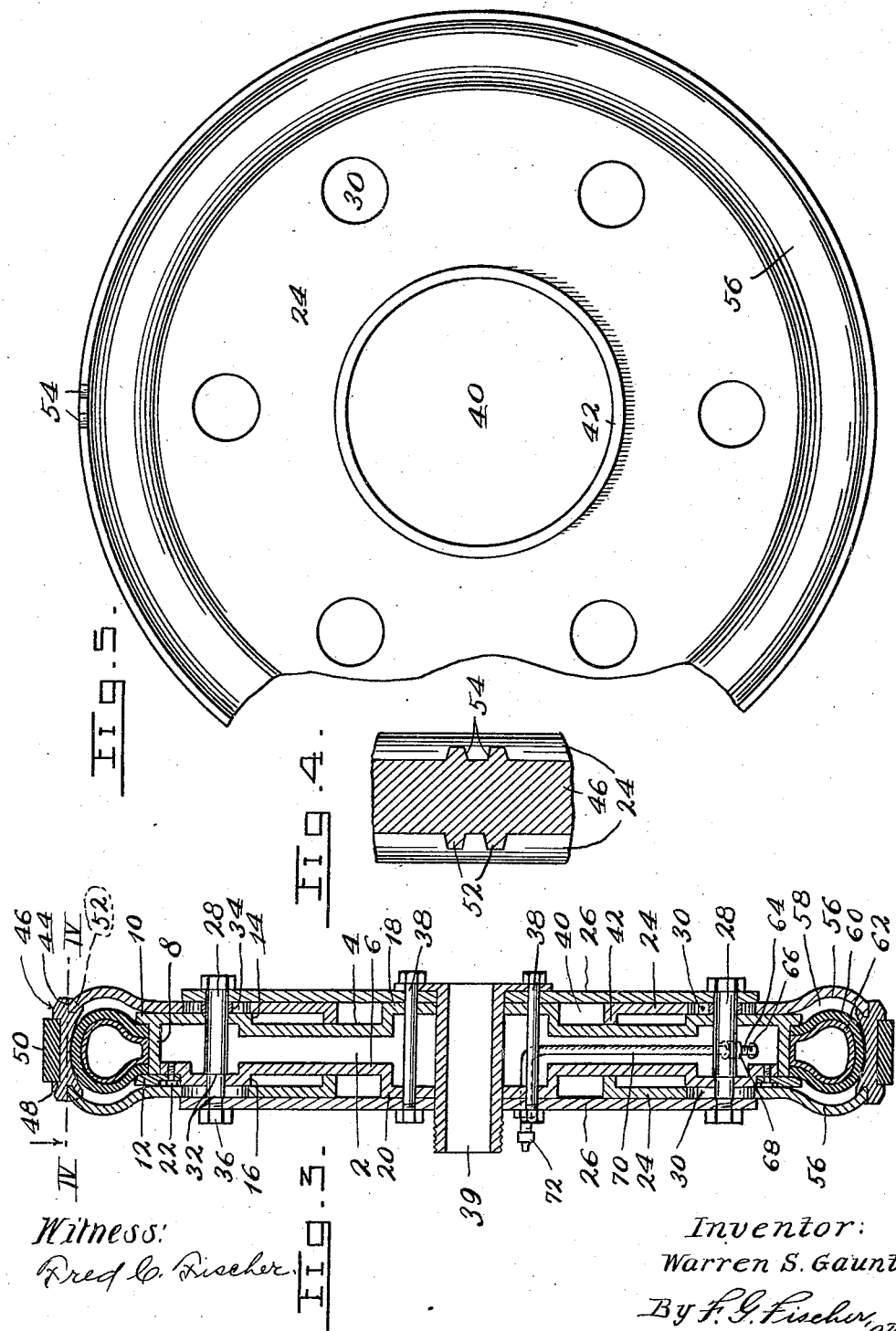

WARREN S. GAUNTT, OF ST. LOUIS, MISSOURI, ASSIGNOR OF ONE-HALF TO ELBERT R. McCORMICK, OF JACKSON, MISSOURI.

VEHICLE WHEEL.

1,418,557. Specification of Letters Patent. Patented June 6, 1922.

Application filed July 20, 1920. Serial No. 397,685.

*To all whom it may concern:*

Be it known that I, WARREN S. GAUNTT, a citizen of the United States, residing at St. Louis, in the county of St. Louis and State of Missouri, have invented certain new and useful Improvements in Vehicle Wheels, of which the following is a specification.

My invention relates to resilient wheels and it embraces a resilient tire preferably of the pneumatic type and a casing enclosing said tire to protect it from puncture, rim cuts and other damage encountered in running over roads. The casing is sufficiently flexible to allow the resilient tire to expand and contract and thus perform its cushioning function of relieving the wheel of undue shock and vibration while running over the road.

In order that the invention may be fully understood, reference will now be had to the accompanying drawings, in which:

Fig. 1 is a side elevation of a wheel constructed in accordance with the invention.

Fig. 2 is a side elevation of the wheel with some parts of the casing removed to disclose the resilient inner tire.

Fig. 3 is an enlarged section on line III—III of Fig. 1.

Fig. 4 is an enlarged fragmentary section on line IV—IV of Fig. 3.

Fig. 5 is a broken side elevation of one of the plates constituting the casing.

In carrying out the invention, I provide a casing consisting preferably of sheet metal and embodying a core 2 consisting of two circular members 4 and 6. The circular member 4 has an integral rim 8 and a marginal flange 10, while the circular member 6 has a removable marginal flange 12. The circular members 4 and 6 are reinforced near their peripheries with annular projections 14 and 16 and adjacent their axis with circular projections 18 and 20, respectively. The removable flange 12 is secured to the circular core member 6 by suitable means such as screws 22.

24 designates a pair of circular plates which are held in frictional engagement with the annular projections 14 and 16 on the circular core members 4 and 6, respectively, by a pair of disks 26 connected by transverse bolts 28. Said bolts 28 fit snugly in openings in the circular core members 4 and 6 and in openings in the disks 26, thus holding the core 2, and said disks 26 in fixed relation to each other, while the plates 24 have limited independent movement of the aforementioned parts by reason of the relatively large openings 30 through which the bolts 28 freely extend. Each bolt 28 is provided adjacent one end with shoulders 32 and near its opposite end with a sleeve 34 to hold the core 2 and the disks 26 in spaced relation to each other and prevent them from binding too tightly against the plates 24, when the nuts 36 are drawn up on the bolts 28.

Bolts 38 coact with the bolts 28 in holding the core 2 and the disks 26 together, and one of the disks 26 is provided with a hub 39, which extends axially through the core 2 and the other disk 26, as disclosed on Fig. 3.

The plates 24 have large axial openings 40 through which the projections 18 and 20 on the circular core members 4 and 6, respectively, freely extend, said openings 40 being surrounded by inwardly extending flanges 42 which bear against the adjacent sides of the core members 4 and 6. The outer margins of the plates 24 fit within annular grooves 44 in the opposite sides of a rim 46, which has a peripheral groove 48 in which a tire 50 is seated. Said tire 50 is, preferably, made of rubber, fabric, or leather, or it may be a combination of two or more of these.

The rim 46 is provided with lugs 52 which fit within corresponding recesses 54 in the margins of the plates 24 to prevent said rim 46 from slipping around upon the plates 24 when the wheel is assembled.

The plates 24 are provided near their peripheries with channels 56, which, together with the periphery of the core rim 8 and the inner periphery of the rim 46, form an annular chamber 58 in which a cushioning element 60 is placed to render the wheel resilient. Said cushioning element 60 consists preferably of the well-known type of pneumatic tire, which on being inflated presses against the rims 8 and 46 and yieldably holds them in proper relation to each other. The chamber 58 is wider than the tire 60, as disclosed on Fig. 3, to allow said tire to expand and contract and thus absorb shocks and vibration.

The inner tube 62 of the tire 60 is equipped with the usual air valve 64, which extends into the core 2 through an aperture 66 in the core rim 8, where it is connected by a coupling 68 to a tube 70 which extends inwardly towards the axis of the core 2, then laterally through the core member 6 and the abutting disk 26, so that it may be coupled to an air pump when the tire 60 is to be inflated. The outer end of the tube 70 is normally closed by a dust cap 72. Access is had to the coupling 68 through an aperture 69 in the core member 6, when the adjacent plate 24 and disk 26 are removed. The tire 60 may be readily installed or removed by removing the core flange 12, and the adjacent plate 24 and disk 26.

By wholly enclosing the tire 60 in the casing as shown and described it is obvious that said tire 60 will be protected from damage by obstacles along the road and from contact with the surface of the road, and by making the casing flexible so that the rim 46 is free to move independently of the core rim 8 the desirable cushioning effect of the pneumatic tire is retained for absorbing shocks, vibration, etc.

While I have shown and described the preferred form of my invention, I reserve the right to make such changes as properly fall within the spirit and scope of the appended claim.

Having thus described my invention, what I claim and desire to secure by Letters Patent, is:

A wheel consisting of a hub, two internal circular members spaced apart and mounted upon said hub, a rim on one of said circular members, a resilient tire mounted upon said rim, concentric annular projections on said circular members, a pair of circular plates slidably engaging the outer annular projections and having inwardly extending flanges slidably engaging the two internal circular members, a pair of disks mounted on the hub and bearing against said circular plates and the inner annular projections of the internal circular members, means rigidly but removably uniting the hub, the internal circular members and said disks, bolts extending through relatively large openings in the plates and uniting the internal circular members and the disks near their peripheries, a rim secured to the peripheries of the circular plates and forming in conjunction therewith and with the rim of the internal circular member an annular chamber in which the resilient tire is disposed, and a flexible tire surrounding the outer rim of said chamber.

In testimony whereof I affix my signature, in the presence of two witnesses.

WARREN S. GAUNTT.

Witnesses:
FRED C. FISCHER,
L. J. FISCHER.